A. A. ARNOLD.
WATCHMAKER'S LOUPE.
APPLICATION FILED OCT. 6, 1917.
1,330,777.
Patented Feb. 17, 1920.
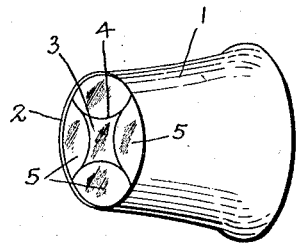
FIG. I.
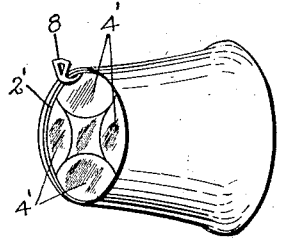
FIG. II.
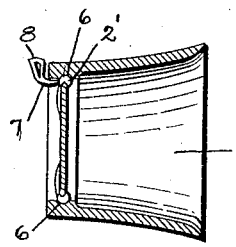
FIG. III.
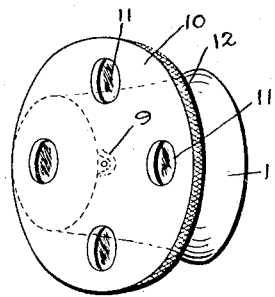
FIG. IV.
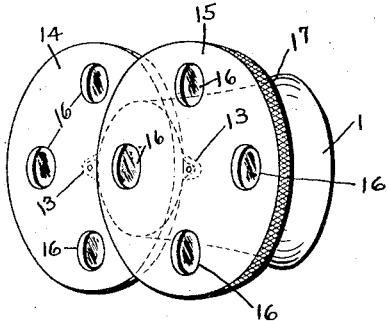
FIG. V.
INVENTOR
ARTHUR A. ARNOLD
BY
H. H. Styll  H. K. Parsons
ATTORNEYS

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

WATCHMAKER'S LOUPE.

1,330,777.      Specification of Letters Patent.      Patented Feb. 17, 1920.

Application filed October 6, 1917. Serial No. 195,046.

*To all whom it may concern:*

Be it known that I, ARTHUR A. ARNOLD, a citizen of the United States, residing at Southbridge, in the county of Worcester and State of Massachusetts, have invented certain new and useful Improvements in Watchmakers' Loupes, of which the following is a specification.

This invention relates to new and useful improvements in watchmakers' loupes and more particularly to a device of this character which is provided with a clear vision lens and a number of foci lenses whereby the loupe can be readily adjusted so that either the plain lens or any of the foci lenses may be brought into focus with the eye and at the same time arranged so that the plain lens can be readily placed before the eyes.

Another object of the present invention is the provision of a watchmaker's loupe wherein a plain lens or various foci lenses can be brought into the focus of the eye without removing the loupe from the eye.

Another object of the present invention resides in the provision of a watchmaker's loupe having rotatable disks mounted thereon and provided with a number of registering openings therein whereby a single focus or a combination of foci may be had without removing the loupe from the eye.

With the above and other objects in view the invention consists in the novel features of construction and the combination and arrangements of parts to be hereinafter more fully described and shown in the accompanying drawings, in which—

Figure I is a perspective view of a watchmaker's loupe constructed in accordance with my invention.

Fig. II is a perspective view illustrating a slightly modified form of the invention.

Fig. III is a longitudinal sectional view of the form shown in Fig. II.

Fig. IV is a perspective view of another form of the invention, and

Fig. V is a perspective view of still another modified form of the invention.

Referring more particularly to the accompanying drawings the numeral 1 indicates the body portion of my improved loupe which may be constructed of zylonite, rubber or any similar material and provided at its smaller end with the lens frame 2 which is adapted to hold the various lenses in place. These lenses arranged within the end of the loupe consist of a substantially rectangular plain lens 3 centrally located and provided with curved side portions 4 adapted to receive the inner edges of the oval shape foci lenses 5. These lenses 5 are preferably cemented to the curved sides of the lens 3, but it will be understood that they may be secured thereto in any desirable manner, while their outer edges are mounted within the frame 2 to securely retain them in an operative position within the loupe.

From the above description taken in connection with the accompanying drawings it will be readily apparent that with my improved loupe a clear or far vision may be obtained and by slight turning movements of the loupe the foci can be quickly changed as there are several lenses of various foci surrounding the plain lens 3. It will be understood that while I have shown and described only four lenses around the lens 3 any number desired may be used. It will also be noted that the lens frame 2 may be readily snapped into place within the end of the loupe or removed therefrom.

In Figs. II and III I have illustrated a modified form of the invention wherein the lens frame 2' is movably mounted within a groove 6 which is formed within the smaller end of the loupe as clearly illustrated in Fig. III. It will be seen that the frame 2' may be readily rotated within the groove 6 so that any one of the lenses 4' can be quickly disposed within focus of the eye without removing the loupe from the eye. In order that the frame 2' may be readily rotated I provide a finger-piece 7 which is secured to the frame in any suitable manner and projects outwardly and upwardly and is provided at its outer end with a handle portion 8 which can be readily grasped to rotate the frame within the loupe.

In Fig. IV I have illustrated a form of the invention wherein the smaller end of the loupe is provided with a centrally located opening and also provided at one side of the body with an outwardly projecting perforated ear 9 upon which is mounted a disk 10 having a circularly arranged series of openings in which the lenses 11 are arranged, said lenses being adapted to be brought into alinement with the opening in the smaller end of the loupe whereby a clear vision can be obtained as one of the lenses 11 is a plain lens, or various foci can be obtained by using the various other lenses in the disk. It will be noted that by mounting the disk 10 on the ear 9 one half of the disk will pass over the end of the loupe so as to bring each one of the different lenses into alinement with the opening in the center of the loupe. It will be seen from a view of the drawings that the periphery of the disk 10 is milled as shown at 12 so that the disk may be readily rotated by engaging either the thumb or one of the fingers with this milled edge. Thus it will be noted that by rotating the disk 10 any one of the lenses 11 can be brought into alinement with the opening in the small end of the loupe whereby either a plain vision or a different focus may be used at the will of the operator.

In Fig. VI I have illustrated a form of the invention wherein the small end of the loupe is provided with outwardly extending lugs 13 which are arranged at diametrically opposite points as illustrated and mounted upon said lugs are the rotating disks 14 and 15. These disks are centrally mounted upon the lugs so that they will rotate over the end of the loupe whereby the circularly arranged openings 16 in each disk can be brought into alinement with the opening in the small end of the disk. As each disk is provided with one plain vision lens arranged in one of the openings 16 while the other openings are provided with different foci lenses various foci and combination of foci can be obtained by rotating either one or both disks as desired. The peripheries of both disks 14 and 15 are milled as shown at 17 whereby the thumb or a finger may be engaged therewith to rotate the disks. In the construction and arrangement of my improved loupe it will be seen that I have provided a simple and durable loupe whereby the foci can be readily changed without removing the loupe from the eye and wherein various combinations of foci may be obtained. While it is preferred to have this loupe constructed of zylonite or a similar material, it will be understood that various materials can be used equally as well.

I claim:

1. In a watchmaker's loupe the combination with a body member, of a visual member disposed at one end thereof and comprising a central visual portion and a plurality of portions of differing foci grouped therearound.

2. In a watchmaker's loupe, the combination with a body member, of a visual member disposed at one end thereof comprising a central clear portion and a plurality of magnifying portions of different foci grouped therearound.

3. A watchmaker's loupe, including a rotatably mounted frame member carrying a plurality of visual members adapted to be swung around in front of the eye to bring the visual members into alinement with the line of vision of the eye.

4. A watchmaker's loupe, including a frame member carrying a plurality of visual members, means rotatably supporting the frame member for movement about in front of the eye to bring the visual members into the line of vision of the eye and certain of said visual members being of different foci, as and for the purpose set forth.

In testimony whereof I have affixed my signature, in presence of two witnesses.

ARTHUR A. ARNOLD.

Witnesses:
H. E. COLEMAN,
E. M. HALVORSEN.